(12) United States Patent
Davies

(10) Patent No.: US 9,250,101 B2
(45) Date of Patent: Feb. 2, 2016

(54) METHOD AND APPARATUS FOR MONITORING POWER CONSUMPTION

(75) Inventor: Peter Davies, London (GB)

(73) Assignee: Green Running Limited, Bath (GB)

( * ) Notice: Subject to any disclaimer, the term of this patent is extended or adjusted under 35 U.S.C. 154(b) by 790 days.

(21) Appl. No.: 13/508,265

(22) PCT Filed: Nov. 5, 2010

(86) PCT No.: PCT/GB2010/002042
§ 371 (c)(1),
(2), (4) Date: Jun. 28, 2012

(87) PCT Pub. No.: WO2011/055122
PCT Pub. Date: May 12, 2011

(65) Prior Publication Data
US 2012/0278014 A1    Nov. 1, 2012

(30) Foreign Application Priority Data

Nov. 6, 2009 (GB) .................................. 0919493.7

(51) Int. Cl.
*G01D 4/00* (2006.01)
(52) U.S. Cl.
CPC ................ *G01D 4/00* (2013.01); *Y02B 90/245* (2013.01); *Y04S 20/38* (2013.01); *Y04S 20/40* (2013.01)
(58) Field of Classification Search
CPC ....................................................... G01D 4/00
USPC ........................................................... 702/61
See application file for complete search history.

(56) References Cited

U.S. PATENT DOCUMENTS

| | | | |
|---|---|---|---|
| 4,858,141 A | 8/1989 | Hart et al. | 702/61 |
| 5,483,153 A | 1/1996 | Leeb et al. | |
| 2010/0191487 A1* | 7/2010 | Rada et al. | 702/60 |

FOREIGN PATENT DOCUMENTS

| | | |
|---|---|---|
| EP | 2026299 A1 | 2/2009 |
| GB | WO2007139587 | 12/2007 |
| GB | 2465367 A | 5/2010 |
| GB | 2471536 | 1/2011 |
| WO | 97/25625 | 7/1997 |
| WO | WO-2009/103998 A2 | 8/2009 |
| WO | 2010/007369 | 1/2010 |

OTHER PUBLICATIONS

Hart G W: "Nonintrusive Appliance Load Monitoring", Proceedings of the IEEE, IEEE. New York, US, vol. 80, No. 12 Dec. 1, 1992 (Dec. 10, 1992), pp. 1870-1891, XP000336363, ISSN: 0018-9219, DOI: DOI: 10.1109/5.192069 The Whole Document.
John W M Cheng et al : "Electric-Load Intelligence (E-LI) : Concept and Applications", TENCON 2006. 2006 IEEE Region 10 Conference, IEEE, PI, Nov. 1, 2006, pp. 1-4, XP031069184, ISBN: 978-1-4244-0548-0 the whole document.

(Continued)

*Primary Examiner* — Bryan Bui
(74) *Attorney, Agent, or Firm* — Dinsmore & Shohl LLP; Mark D. Schneider

(57) ABSTRACT

An apparatus and associated method of monitoring power consumption of an electrical device, the method comprising identifying an electrical device using a power signature unique to that device, the power signature being derived from power consumption measurements, and location information; and monitoring power consumption of such an identified device.

7 Claims, 3 Drawing Sheets

(56) References Cited

OTHER PUBLICATIONS

Najmeddine H et al: "State of art on load monitoring methods", Power and Energy Confernece, 2008, PECON 2008. IEEE 2nd International, IEEE, Piscataway, NJ, USA, Dec. 1, 2008, pp. 1256-1258, XP031413104, ISBN: 978-1-4244-2404-7 the whole document.

Hsueh-Hsien Chang et al: "Load recognition for different loads with the same real power and reactive power in a non-intrusive load-monitoring system", Computer Supported Cooperative Work in Design, 2008. CSCWD 2008. 12th International Conference on, IEEE, Piscataway, NJ, USA, Apr. 16, 2008, pp. 1122-1127, XP031269021, ISBN: 978-1-4244-1650-9 the whole document.

Lam H Y et al: "A Novel Method to Construct Taxonomy Electrical Appliances Based on Load Signaturesof", IEEE Transactions on Consumer Electronics, IEEE Service Center, New York, NY, US, vol. 53, No. 2, May 1, 2007, pp. 653-660, XP011186790, ISSN: 0098-3063, DOI: DOI: 10.1109/TCE.2007.381742* abstract p. 653, paragraph 1. Introduction.

International Search Report/Written Opinion—dated Mar. 16, 2011, PCT/GB2010/002042.

Nonintrusive Appliance Load Monitoring, George W. Hart, Senior Member, Proceedings of the IEEE, vol. 80, No. 12, Dec. 1992, pp. 1870-1891.

Data Extraction for Effective Non-Instrusive Identification of Residential Power Loads, IEEE Instrumentation and Measurement Technology Conference, Agnim I Cole and Alexander Albicki, Department of Electrical Engineering, May 18-21, 1998, pp. 812-815.

* cited by examiner

METHOD AND APPARATUS FOR MONITORING POWER CONSUMPTION

CROSS-REFERENCE TO RELATED APPLICATIONS

This application is the U.S. national phase of PCT/GB2010/002042 filed Nov. 5, 2010, which claims priority of Great Britain Patent Application 0919493.7 Nov. 6, 2009, the contents of which are incorporated within in their entirety.

FIELD OF THE INVENTION

The present invention relates to a method and apparatus for monitoring and controlling of energy consumption and in particular for monitoring and controlling energy consumption within a unit such as a building.

BACKGROUND OF THE INVENTION

As awareness of issues, such as dwindling natural resources and accelerating global warming, relating to unchecked consumer energy consumption grows, systems and methods to monitor energy being consumed have been developed. An example of such as system is a "smart meter", which is an advanced meter, for example an electrical meter, which is attached to a device or unit that uses electricity, such as a building. A smart meter may monitor and records energy consumption in more detailed manner than a conventional meter. Typically, such smart meters communicate the recorded information back, via a system such as a telecommunications network, to the energy supplier whose systems measure, collect and analyze recorded energy usage for monitoring and billing purposes. Smart meters can help consumers measure and manage energy consumption, working on the basis that if the consumer knows how much energy they are using and can see which actions reduce that energy consumption they can adopt those actions as habits.

Smart meters typically comprise real-time or near real-time sensors, power outage notification means, and means for power quality monitoring and the meter can monitor and record energy consumption such as gas, electricity or water. The gathered information can be transferred to the supplier through a suitable communication medium either on request or on a pre-defined schedule. The infrastructure to facilitate this includes the hardware of the actual meter, software such as data management software, communication means and customer associated systems.

The network between the smart meter and business system end of energy provision allows collection and distribution of information to customers, suppliers, utility companies and service providers. This enables these parties to participate in, provide, and/or demand response solutions, products and services. By providing information to customers, the system assists a change in energy usage from the normal user consumption patterns, either in response to changes in price or in direct response to incentives designed to encourage lower energy usage use at times of peak-demand periods or higher wholesale prices or during periods of low operational systems reliability.

An example of system involving smart meters being implemented is "AlertMe", an online energy management service working with Google™'s PowerMeter software. Using a type of smart meter which clips onto a pre-existing meter to record usage, information can be provided to the AlertMe service. This system then gives consumers the ability to monitor, via the internet, how they are using energy within their homes from any remote location. Based upon this information, consumers can make better decisions on how to use energy in order to help reduce their utility bills and the size of their carbon footprint.

Another such system which provides consumer feedback on energy usage and which can be retrofitted to existing installations is the eRunner Energy Monitor. This provides a graphical display of energy usage such as electricity, water or gas, provides an alert in the event of irregular usage or power failure and is compatible with smart meters. This system takes information from the smart meters and allows consumers to compare multiple building or sites on a real time basis; compare each day's data to a 'perfect day'; see energy usage instantaneously; retrieve stored data for historic viewing; monitor temperature and humidity; calculate which energy provider offers best value for the particular usage patterns; exception and error reporting on live updates via text or email if required and tailor reports of energy usage as is required.

By comparison, traditional meters only measure total consumption and as such, provide no information of when the energy was consumed and traditional reporting systems merely generate a final bill. Smart meters provide an economical way of measuring this information and the related reporting systems available can give feedback on the usage patterns recorded.

However, whilst use of a smart meter can provide a clearer picture of energy consumption patterns in terms of real time usage, for larger units, such as buildings, there is currently no way of identifying what is creating the energy usage beyond manually assessing all possible energy consuming devices operating within the unit. Whilst in a small environment, such as a home, such a manual assessment of energy consuming devices may be a relatively simple process, within a larger environment, such as a factory or office block, this becomes an unwieldy and impractical undertaking

SUMMARY OF THE INVENTION

In view of the above, an object of the present invention is to obviate or mitigate at least one of the aforementioned problems.

A first aspect of the present invention provides a method of monitoring power consumption of an electrical device, the method comprising identifying an electrical device using a power load signature unique to that device, the power signature being derived from power consumption measurements, and power consumption pattern of such an identified device.

In one embodiment, the power signature is derived from power consumption measurements and location information.

Preferably, the location information relates to a location of the device in an electrical installation wiring layout.

The power load signature may be created by the load used by the device when powered or in use. Alternatively, the power load signature may be created by the device when powered or in use coupled with the power change detectable through the mains supply. The power through the mains supply may be monitored in the conventional means.

The power load signature may be derived from one or more of a combination of measurements including, but not restricted to, changes in phase angle; detected on/off transients and the frequency components in one or more of said transients; detected load measurements, amps RMS, amp frequency change; volts RMS; volts frequency change; reactive power readings and relative power readings; pattern effects of any of these measurements over time, and pattern effects across three phases. However, it will be appreciated that for a large number of devices, only detected raw amps RMS is required and simple pattern detection to distinguish the signature from that of other devices.

Furthermore, device location on the line can also affect its energy pattern, which could be used as a means of distinguishing different signatures from one another and as a means for identification of detected signatures.

Furthermore, device load effects on other device loads on the mains line may also affect its energy pattern and be used as a means of distinguishing different signatures from one another and as a means for identification of signatures for determining which devices are drawing power from the line.

A further aspect of the present invention provides an apparatus for monitoring power consumption of an electrical device, the apparatus comprising an identification unit operable to derive a power signature specific to a device, such a power signature being derived from power consumption measurements and characteristics, and optionally location information for the device concerned, the identification unit being further operable to identify an electrical device in dependence upon such a power signature; and a monitoring unit operable to monitor power consumption of such an identified electrical device.

The specific power signature may be unique to that device.

In one embodiment, the power signature is further derived from the usage pattern of the power consumption measurements over time.

In one embodiment, the location information relates to a location of the device in an electrical wiring layout.

In one embodiment, the power signature is derived from power consumption measurements and characteristics over time, including over varied time period lengths.

A further aspect of the present invention provides a method of monitoring power consumption of an electrical device within an electrical system, the method comprising monitoring power consumption of the electrical system; deriving a composite power signature from the monitoring of power consumption of the electrical system; identifying and assigning a unique power signature associated with the electrical device from within the composite power signature; and monitoring the power consumption of the electrical device using the assigned unique power signature.

BRIEF DESCRIPTION OF THE DRAWINGS

An embodiment of the present invention will now be described, by way of example only, and with reference to the following drawings, in which.

DETAILED DESCRIPTION OF THE PREFERRED EMBODIMENTS

Figure 1:
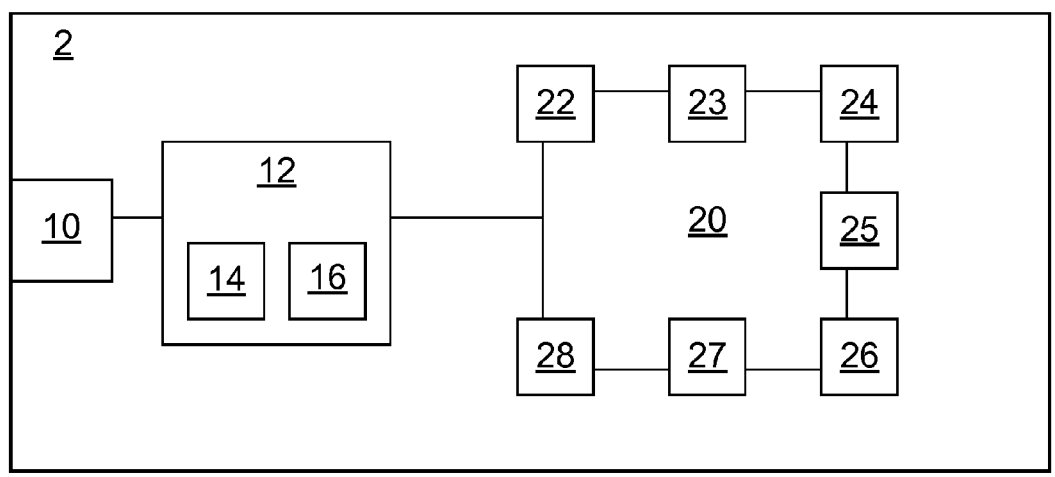
FIG. 1 shows a schematic diagram of an electrical circuit of a building having a monitoring system according to the present invention.

Referring to FIG. 1 there is shown a building 2, in this case an office, having a mains electrical power supply 10 provided with a real-time energy monitoring and management system 12 having display tools (not shown) which give an indication of real time energy consumption. Within the system 12 there is included a power signature identification unit 14 and a power consumption monitoring unit 16 which in this case is a smart meter. However, it will be appreciated that any other suitable power consumption monitoring unit known to the skilled person may be used as an alternative. The electrical supply to the building provides electricity to a circuit 20 supplying devices including in this case lights 22; central heating 23; air conditioning 24, computer 25, photocopier 26 and kettle 27.

The power signature identification unit 14 derives a power signature specific to each of the given devices 22 to 27. In this case, the power signature identification unit 14 identifies a power signature created by each of the given devices 22 to 27. The power signature is derived from power consumption measurements and load characteristics taken by the unit 14 or from the real-time data information taken from the meter 16 (if that meter has the functionality to provide data at the required sampling rates) and, optionally, if required, location information regarding the location of the device concerned within the circuit 20. The identification unit 14 uses this information to identify when the device is in use, or has been in use, by recognizing the power signature during a period of power consumption. From this data, and using signal analysis software tools which differentiate between the devices 22 to 27, the system 12 calculates how much energy any given individual device has used during the course of the day. The functioning of the power signature identification unit 14 depends on the fact that each device has its own specific usage signature pattern which is dependent upon both the power consumption characteristics of the device itself and optionally the location of the device within the electrical circuit 20 of the building 2 with which it is connected.

In a first embodiment of the power signature identification unit 14, data is collected via a current transformer where there signature is derived from the Amp signal received. The raw amps being drawn by the device are also able to give off characteristics to determine whether the device is indeed consuming power and although cannot calculate the exact power usage is able to provide enough detail to determine if the device is consuming power. And hence a system which is less accurate but more easily retro fitted can be produced by using simple current transformers to pick up the amp signals being produced on the mains by the devices. In this embodiment the system 12 can simply be retrofitted to existing electrical installations with no need for changes to a buildings infrastructure. This can be of particular value to organisations wishing to assess the number of uses or measure the power consumption of a device or group of devices within a given time period.

In a second embodiment of the power signature identification unit 14, data is collected via the power signature signal readings where the real time voltage of the signal is taken in conjunction with the real time Amp reading. The amp reading is taken via a current transformer or means in which the Amps signal can be distinguished (example is chip used in electricity meters and the power signal with phase angle is calculated. This data is then sampled at high speed and the individual power device power signatures are deduced from the data. Retro fitting is more difficult in this case and the ideal is that the system sits in line with the cables (like an existing meter) as accurate voltage must be measured from each phase then the phase angle calculated, but the outcome is a more accurate system.

The data collected by the power signature identification unit 14 is analysed and an advanced report generation system (not shown) is used to transform the data into a format, representative of real time power consumption of the building 2 and specific device power consumption of the devices 22 to 27 within the building 2, which is simple for a user to view and interpret.

In this example, internet data streaming is used to provide the data to individuals so that they may view the data either on-site or remotely. As the data is streamed via the internet, the individuals may be anywhere in the world. These individuals will see the data in the format of reports of energy usage, see changes in consumption when a device is turned on and be able to identify the associated device, compare the data with historical data and take appropriate actions if needed. The user can see the data remotely but has no control over the system and, depending on the speed and level of processing, will be able to view device on/off information in real-time or in a post-processed report format.

In this case, the power signature identification unit 14 undertakes signature analysis by monitoring the power usage of the building over a given length of time at a high sampling frequency of around 50 kHz (a higher sampling frequency could be used to provide a greater accuracy, if required). The greater the sampling frequency, the greater the amount of monitored data i.e. signal information, that is available and therefore the more accurate the system. It is to be appreciate that sampling rates of up to 1 kHz are also acceptable in many circumstances, for example, where it is required to distinguish large load devices from one another whose loads are spread out on three phases, where all three phases are being monitored (a standard power setup)—this eases the pattern matching process. The greater sampling rate results in more signal information and therefore increased accuracy of characteristics available to compare changes in the load.

The characteristics of each device's power consumption can be analysed and used to calculate the features that make up the signature for that piece of equipment including on/off transients, signal shape/pattern including signal shape/pattern over time, frequency components, effects to the phase angle, load change in RMS, relative and reactive power change, three phase pattern or a combination of any of the aforementioned characteristics, including over various time periods, to determine which device is being detected. In this way, it can be seen when various devices are being switched on and off enabling each specific device signature detected to be identified and assigned to a specific electrical device. The unit 14 can then determine, using a series of signal analysis techniques, which devices are on, when they were switched on, how long they have been switched on for, and how much power each device is using or has used. In this example, the signal analysis techniques are implemented by software embedded within the unit 14. The signal analysis techniques include Fourier analysis, filters and cross correlation of devices amongst other available signal processing algorithms known to the skilled person. This analysis in turn provides the detailed information that can be used by the unit 12 to provide an output detailing the required information. If required, a neural network or other AI tool could be used to support various signal processing results in order to determine the likelihood of a specific signature pattern or set of patterns being attributable to a particular device.

The signature of the individual device is intended to include the natural power consumption of that device and the pattern it produces in terms of load signal change to the power line being monitored over time, whether read using just Amps, or full power, relative or absolute and phase angle. The more information gained the more accurate the system will be. The more information used, the easier the devices are to detect and identify. However, it will be appreciated that many devices can be pattern matched using the raw Amp changes alone.

Unit 14 may also contain a neural network or artificial intelligence to utilise the various items of received signal information to distinguish the device signatures when they arise to determine which device has been turned on/off. Each individual signal may be processed using a "calibration mode", where the system learns the changes the powered individual device makes to the mains power line and hence learns its characteristics or 'signature' for future reference when identifying which device it is that has been turned on/off. Characteristics include, as previously mentioned, change in signal shape, on/off transients, change in frequency components, phase angle changes, relative power change, reactive power change, three phase pattern match, RMS value changes.

The system can either work in real time or have the data post-processed, post processing will be able to provide more accurate breakdown of the individual devices though as processing power increases the system will be able to process the data and identify the device in real time, dependent on the threshold levels selected for the chosen artificial intelligence network (e.g. Neural network threshold levels). The neural network may contain a large number of comparing factors such as, but not limited to, one or more of: expected change in load, expected change in frequencies, expected change in phase angle, on transient pattern change, on transient frequency change, off pattern frequency change, running pattern frequency change, running pattern load change, and running pattern variation. The more comparing factors used, the more accurate the system is at identifying the devices and the more effective the system is at distinguishing the low watt devices (60 watt and below).

A simple version of a system according to the present invention can be construed and implemented by applying current clamps to monitor the data, a data acquisition device to sample the raw amps at 1 kHz on the mains power line, then simple cross correlation techniques and RMS read value changes in a simple neural network to determine the different devices (large load devices, inductive, capacitive or resistive) that are on the same power line and the point at which they were turned on/off and how much power they approximately consumed while they were on.

Figure 2A:
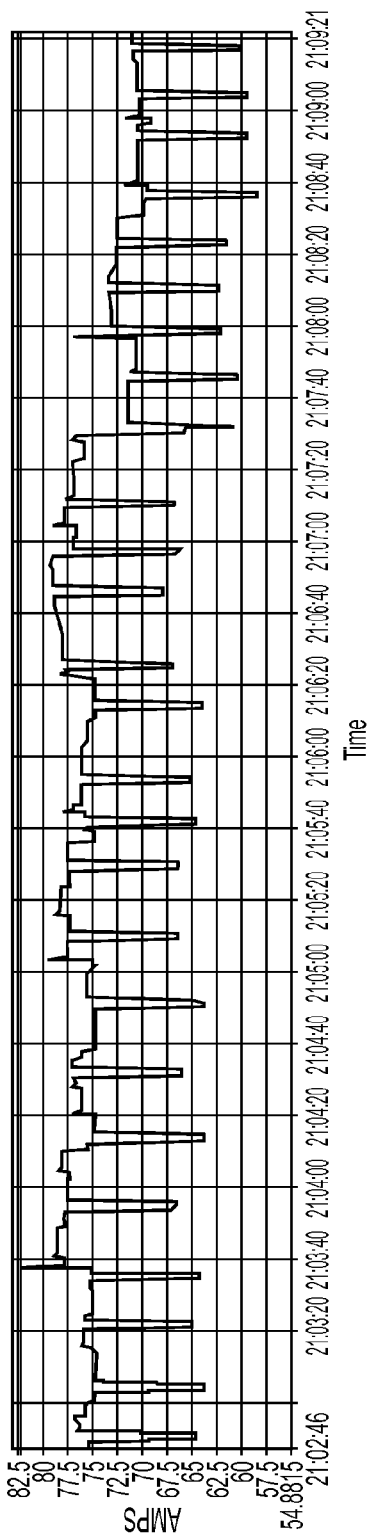
FIG. 2A shows a graphical representation of an overall power signature recorded in the building of FIG. 1.

With reference to FIG. 2A there is illustrated a graphical representation of a power signature reading from a building such as that of FIG. 1 which devices 22 to 27 are in operation and consuming power from the electrical supply. In this graph, the power signature is represented over a period of time and shows a single overall composite power signature signal produced by the addition of the power signature signal generated by each of devices 22 to 27.

Figure 2B:
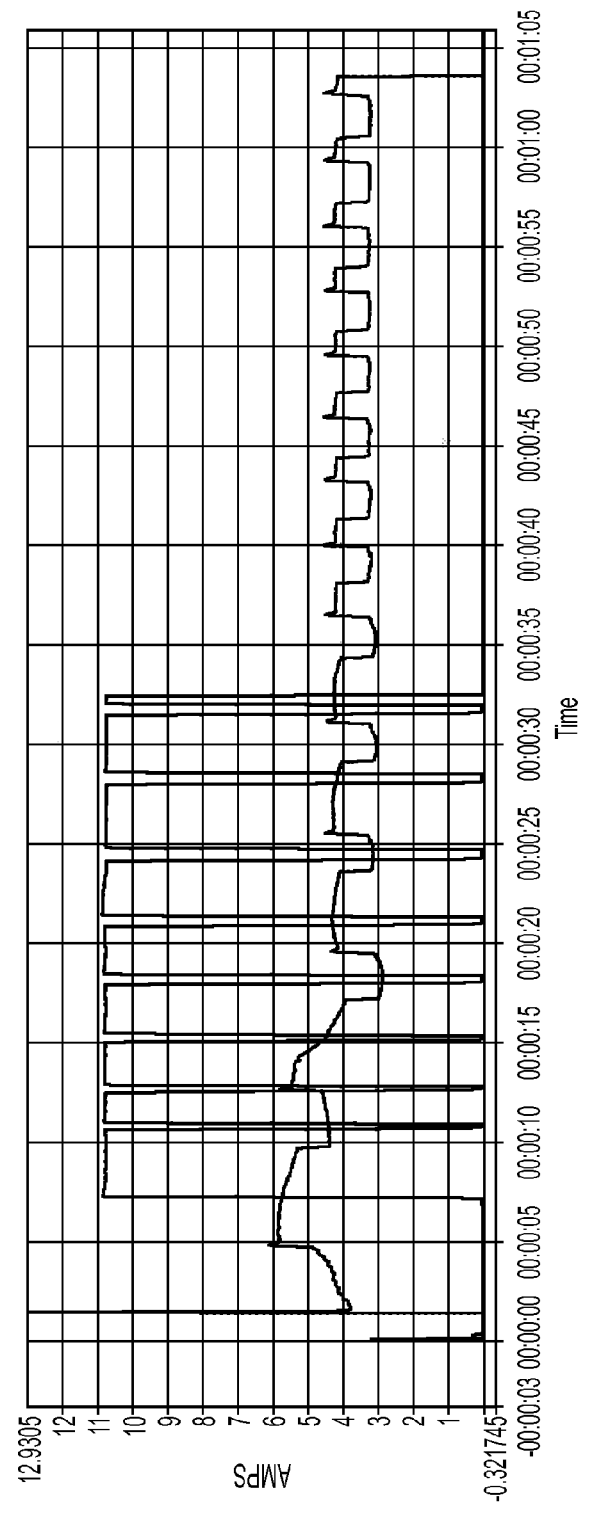
FIG. 2B shows a graphical representation illustrating the individual power signature of two devices of the building in FIG. 1 which form part of the overall signal of FIG. 2A.

In FIG. 2B there is illustrated a graphical representation of the respective power signal of two of the devices, in this case photocopier 27 and central heating 23, of building 2 shown separately on the graph. These two power signals are components of the overall signal shown in FIG. 2A. These individual signals would form two of the individual data files which would be collected by the power signature identification unit 14, for example through a calibration sequence.

The data provided by the real-time energy monitoring and management system 12 could be used in a number of different ways.

In one situation, signature analysis of the data from system 12 may show, for example, the air conditioning system 24 to be switching on an excessive amount of time before the first people arrive in building 2. By identifying that this prolonged lead-in time is unnecessary, the timing for the air conditioning system 24 can be adjusted accordingly which will result in an energy saving.

In another situation, the data output from System 12 shows unexpectedly high energy usage occurring on one particular day. The data provides an indication of the location within the circuit 20 and type of device which has inadvertently been left switched on. This enables the device to be identified and, if applicable, turned off.

The system 20 is able to provide an output detailing occurrences of irregular usage and identifying devices and time periods where savings in energy would be possible by providing output data for comparison against predetermined data corresponding to the usage of a perfect day for that system 20. Use of such a comparison facility can be made accessible by the provision of user friendly interfaces for ease of interpretation of the data by a user.

Data can also be collected to enable comparisons between energy usage at different sites to aid implementation of the most effective and best practices at all branches.

The user interfaces for the system can be used to display data which identifies the more obvious devices turning on and off in real time.

An example of this is that the system will be able to indicate the amount of times the kettle has been used that day. Should the usage of the kettle be at a suitably frequent and sustained level, this information may be able to be used to establish that a hot water urn would be a more efficient device to have in use as an alternative to the kettle.

Figure 3:
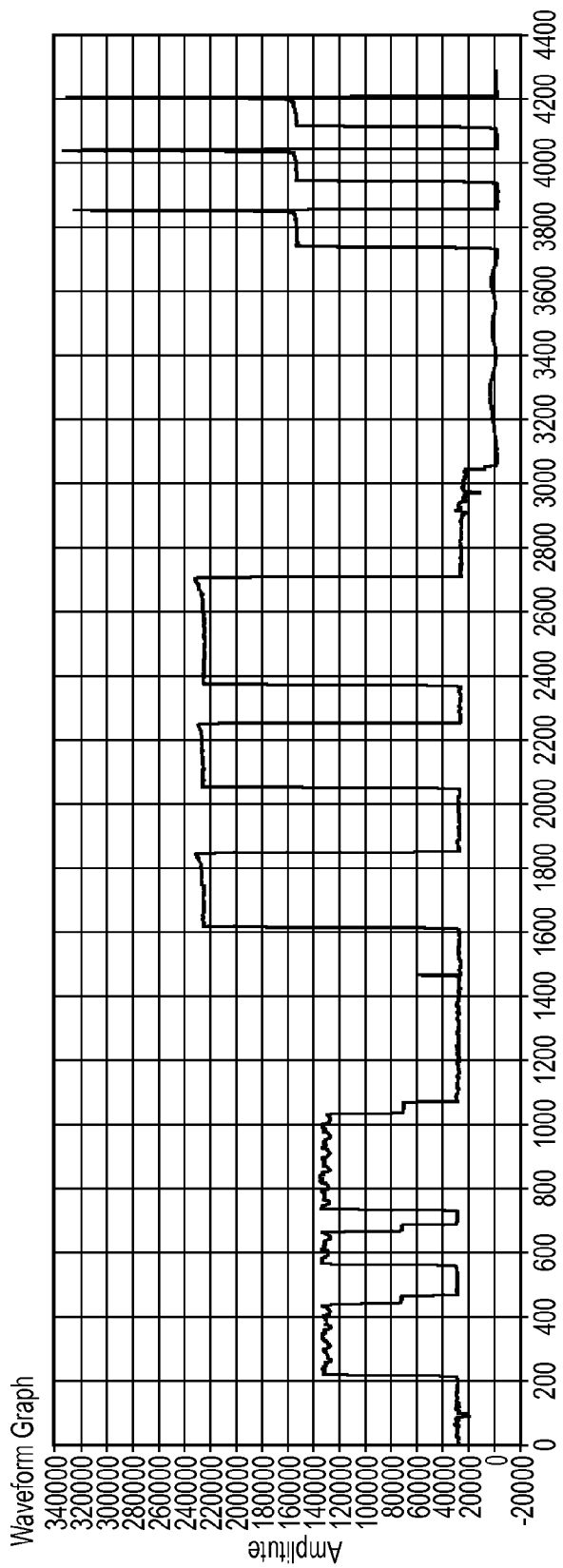
FIG. 3 shows a graphical representation of a power signature for three common household items.

In FIG. 3 there is illustrated a graphical representation of three different household objects, in this case a kettle, a tumble drier and a microwave. As can be seen, the power signature generated by each of these devices is clearly identifiable. A real-time energy monitoring and management system could similarly operate within a household environment and the data collected could provide information which would enable efficient use of energy resources.

Various modifications may be made to the embodiments hereinbefore described without departing from the scope of the invention. For example, it has been described above that the system may be implemented in an office building or a household. However, it will be understood that the system may be used to analyze a single device, alternatively it may be implemented within any type of unit to which electricity is supplied, such as a single room; a hospital; a factory, municipal facilities or the like. The data output from the system may be made available locally by having a user interface attached to the system. Alternatively the output may be provided via communication means to an electronic system such as a computer.

Furthermore, it will be appreciated that the apparatus of the present invention does not have to rely on a smart meter to get the necessary power consumption measurements etc, but can in fact, acquire the information from current clamps placed around the mains cables.

The invention claimed is:

1. A method of monitoring power consumption of an electrical device, the method comprising:
   automatically deriving a power load signature for an electrical device, the power load signature being unique to the electrical device concerned, and being derived from power consumption measurements for the electrical device concerned using pattern matching of power consumption measurements across three electrical supply phases;
   automatically identifying an electrical device using such a power load signature using pattern matching of power consumption measurements across three electrical supply phases; and
   monitoring power consumption of such an identified electrical device,
   wherein the power consumption measurements include at least one of a characteristic chosen from on/off transients, signal shape/pattern including signal shape/pattern over time, frequency components, changes in phase angle, load change in RMS, relative and reactive power change, three phase pattern and any combination thereof.

2. The method of claim 1, wherein the power load signature is derived from said power consumption measurements and location information.

3. The method of claim 2, wherein the location information relates to a location of the device in an electrical wiring layout.

4. An apparatus for monitoring power consumption of an electrical device, the apparatus comprising:
   an identification unit operable automatically to derive a power signature unique to an electrical device, such a power signature being derived from power consumption measurements including at least one of a characteristic chosen from on/off transients, signal shape/pattern including signal shape/pattern over time, frequency components, changes in phase angle, load change in RMS, relative and reactive power change, three phase pattern and any combination thereof using pattern matching of power consumption measurements across three electrical supply phases, the identification unit being further operable to identify an electrical device in dependence upon such a power signature using pattern matching across three electrical supply phases; and
   a monitoring unit operable to monitor power consumption of an electrical device identified by the identification unit.

5. The apparatus of claim 4, wherein the power signature is derived from said power consumption measurements and characteristics over time.

6. The apparatus of claim 5, wherein the power signature is derived from power consumption measurements and characteristics over varied time period lengths.

7. The apparatus of claim 4, wherein the power signature is derived from such power consumption measurements and from location information relating to a location of the device in an electrical wiring layout.

* * * * *